(12) United States Patent
Choi et al.

(10) Patent No.: US 9,131,389 B2
(45) Date of Patent: Sep. 8, 2015

(54) CONNECTED MODE GAP MEASUREMENT FOR LTE TDD

(71) Applicant: QUALCOMM Incorporated, San Diego, CA (US)

(72) Inventors: Jun Won Choi, San Diego, CA (US); Raghu Narayan Challa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 101 days.

(21) Appl. No.: 13/779,691

(22) Filed: Feb. 27, 2013

(65) Prior Publication Data

US 2013/0223256 A1    Aug. 29, 2013

Related U.S. Application Data

(60) Provisional application No. 61/604,466, filed on Feb. 28, 2012.

(51) Int. Cl.
*H04W 24/00* (2009.01)
*H04L 25/02* (2006.01)

(52) U.S. Cl.
CPC ........... *H04W 24/00* (2013.01); *H04L 25/0224* (2013.01)

(58) Field of Classification Search
CPC .......... H04B 17/0057; H04B 17/0077; H04W 4/023; H04W 64/00; H04W 24/08; H04W 72/005; H04L 27/2613; H04L 27/2666
USPC ......... 370/252, 328, 329, 336, 437, 468, 312, 370/280, 203, 281, 330, 206, 208, 210, 264, 370/278, 335, 338, 436, 458, 463, 540; 455/226.1, 450; 375/260, 224, 267, 375/E1.033, 135, 231, 232, 285, 295, 340, 375/343, 346
See application file for complete search history.

(56) References Cited

U.S. PATENT DOCUMENTS

2009/0291687 A1    11/2009   Vachhani et al.
2010/0118706 A1 *   5/2010   Parkvall et al. ............... 370/241
(Continued)

FOREIGN PATENT DOCUMENTS

TW            201206211 A      2/2012

OTHER PUBLICATIONS

Ericsson et al., "FDD Inter-Frequency RSRP Measurement Performance Requirements", 3GPP Draft; R4-080162, 3rd Generation Partnership Project (3GPP), Mobile Competence Centre ; 650, Route Des Lucioles ; F-06921 Sophia-Antipolis Cedex ; France, vol. RAN WG4, no. Sorrento, Italy; Feb. 5, 2008, XP050178811, [retrieved on Feb. 5, 2008].

(Continued)

*Primary Examiner* — Charles C Jiang
*Assistant Examiner* — Rose Clark
(74) *Attorney, Agent, or Firm* — Seyfarth Shaw LLP

(57) ABSTRACT

A method of wireless communication includes selecting three or more reference signal symbols from at least two subframes detected within a measurement window location during a connected mode gap. The selected reference signal symbols are selected from reference signal symbols of at least one non-MBSFN subframe and one reference signal symbol of a special subframe. The method also includes combining the selected reference signal symbols and estimating a reference signal received power (RSRP) based at least in part on a result of the combining.

20 Claims, 14 Drawing Sheets

(56) References Cited

U.S. PATENT DOCUMENTS

| | | | |
|---|---|---|---|
| 2010/0195518 | A1 | 8/2010 | Mccloud et al. |
| 2010/0260151 | A1 | 10/2010 | Onggosanusi et al. |
| 2010/0279638 | A1 | 11/2010 | Lindoff |
| 2011/0256833 | A1 | 10/2011 | Racz et al. |
| 2012/0040691 | A1* | 2/2012 | Han et al. .................. 455/456.1 |
| 2012/0087264 | A1* | 4/2012 | Lindoff et al. ............... 370/252 |
| 2013/0201840 | A1* | 8/2013 | Sorrentino et al. .......... 370/252 |
| 2013/0265929 | A1* | 10/2013 | Cai et al. ..................... 370/312 |
| 2013/0329818 | A1* | 12/2013 | Yu et al. ...................... 375/260 |
| 2013/0343241 | A1* | 12/2013 | Niu et al. ..................... 370/280 |
| 2014/0169345 | A1* | 6/2014 | Seo et al. ..................... 370/336 |
| 2014/0323152 | A1* | 10/2014 | Zhang et al. ............... 455/456.1 |

OTHER PUBLICATIONS

Ericsson: "Impact of Sub-frame Configuration on TDD Inter-Frequency RSRP Measurement Performance", 3GPP Draft; R4-080163, 3rd Generation Partnership Project (3GPP), Mobile Competence Centre; 650, Route Des Lucioles; F-06921 Sophia-Antipolis Cedex; France, vol. RAN WG4, no. Sorrento, Italy; Feb. 5, 2008, XP050178812, [retrieved on Feb. 5, 2008].

International Search Report and Written Opinion—PCT/US2013/028430—ISA/EPO—May 27, 2013.

Kurjenniemi, J., et al., "Effect of measurement bandwidth to the accuracy of inter-frequency RSRP measurements in LTE", IEEE 19th International Symposium on Personal, Indoor and Mobile Radio Communications (PIMRC), Sep. 15, 2008, IEEE, Piscataway, NJ, USA, pp. 1-5, XP031371560, ISBN: 978-1-4244-2643-0.

Taiwan Search Report—TW102107294—TIPO—Sep. 10, 2014.

* cited by examiner

CONNECTED MODE GAP MEASUREMENT FOR LTE TDD

CROSS-REFERENCE TO RELATED APPLICATION

This application claims the benefit under 35 U.S.C. §119 (e) to U.S. Provisional Patent Application No. 61/604,466 entitled CONNECTED MODE GAP MEASUREMENT FOR LTE TDD, filed on Feb. 28, 2012, the disclosure of which is expressly incorporated by reference herein in its entirety.

BACKGROUND

1. Field

Aspects of the present disclosure relate generally to wireless communication systems, and more particularly to a connected mode gap measurement for LTE TDD (time-division duplex).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

According to an aspect of the present disclosure, a method of wireless communication is presented. The method includes selecting three or more reference signal symbols from at least two subframes detected within a measurement window location during a connected mode gap. The method also includes combining the selected reference signal symbols. The method further includes estimating a reference signal received power (RSRP) based at least in part on a result of the combining.

According to another aspect of the present disclosure, an apparatus for wireless communications is presented. The apparatus includes means for selecting three or more reference signal symbols from at least two subframes detected within a measurement window location during a connected mode gap. The apparatus also includes means for combining the selected reference signal symbols. The apparatus further includes means for estimating a RSRP based at least in part on a result of the combining.

According to yet another aspect, a computer program product for wireless communications is presented. The computer program product includes a non-transitory computer-readable medium having program code recorded thereon. The program code includes program code to select three or more reference signal symbols from at least two subframes detected within a measurement window location during a connected mode gap. The program code also includes program code to combine the selected reference signal symbols. The program code further includes program code to estimate a RSRP based at least in part on a result of the combining.

According to still yet another aspect, an apparatus for wireless communications is presented. The apparatus includes a memory and a processor(s) coupled to the memory. The processor(s) is configured to select three or more signal symbols from at least two subframes detected within a measurement window location during a connected mode gap. The processor(s) is also configured to combine the selected reference signal symbols. The processor(s) is further configured to estimate a RSRP based at least in part on a result of the combining.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
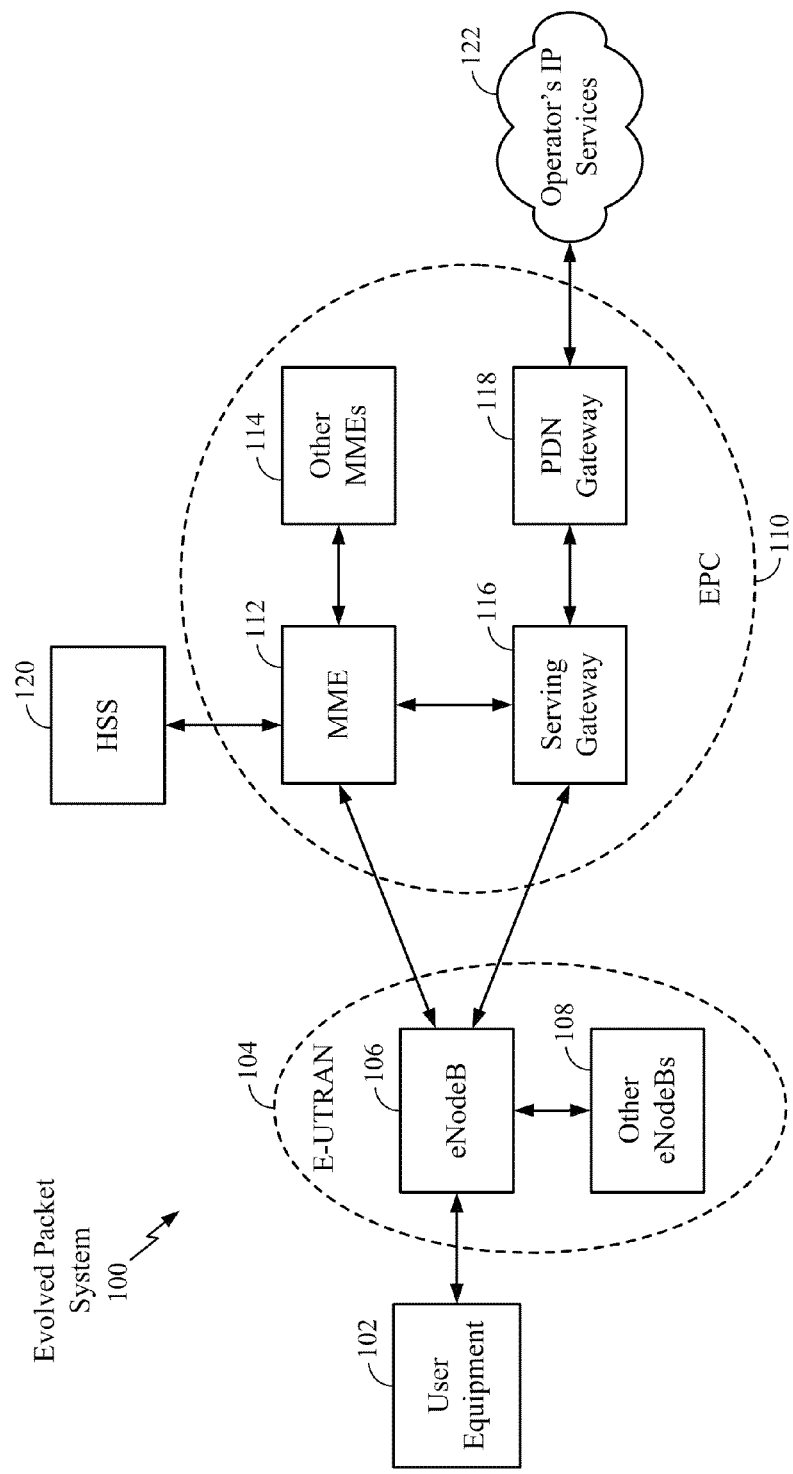
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware, software, or combinations thereof depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. LTE can refer generally to LTE and LTE-Advanced. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a tablet, a netbook, a smartbook, an ultrabook, a camera, a game console, or any other suitable device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a Packet-Switched (PS) Streaming Service (PSS).

Figure 2:
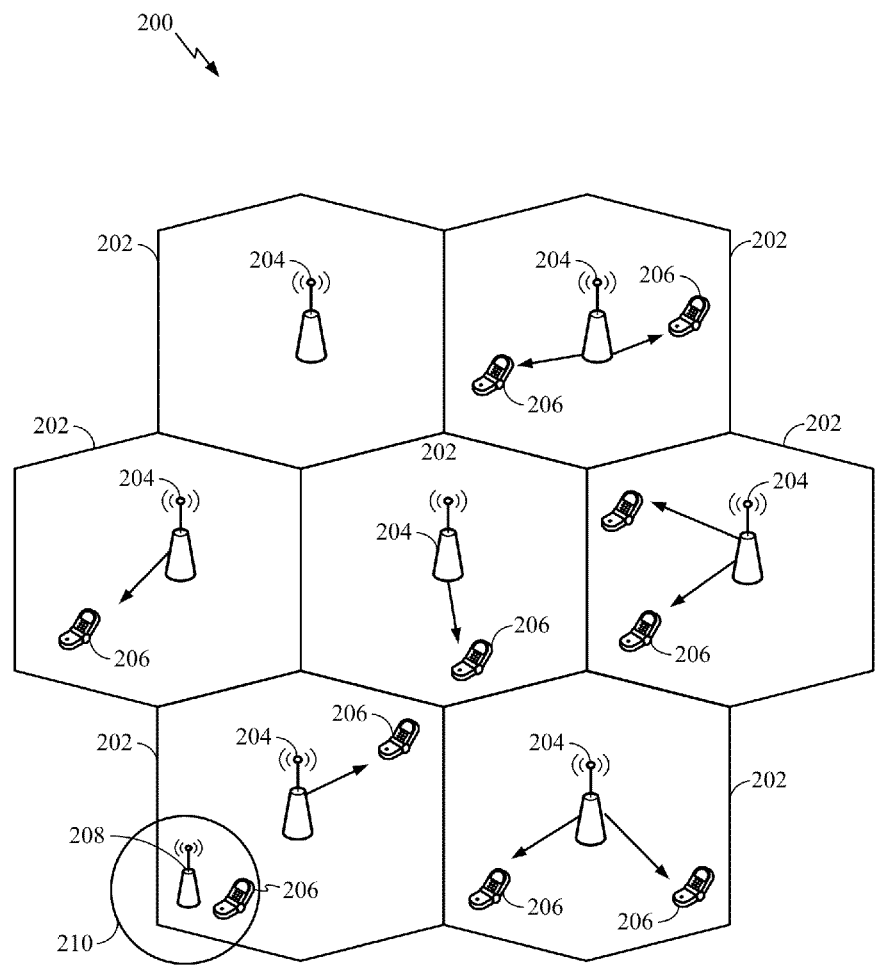
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM (orthogonal frequency division multiplexing) is used on the downlink and SC-FDMA (single-carrier frequency division multiple access) is used on the uplink to support both frequency division duplex (FDD) and time division duplex (TDD). As those skilled in the art will readily appreciate from the detailed description to follow, the various concepts presented herein are well suited for LTE/LTE-Advanced applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
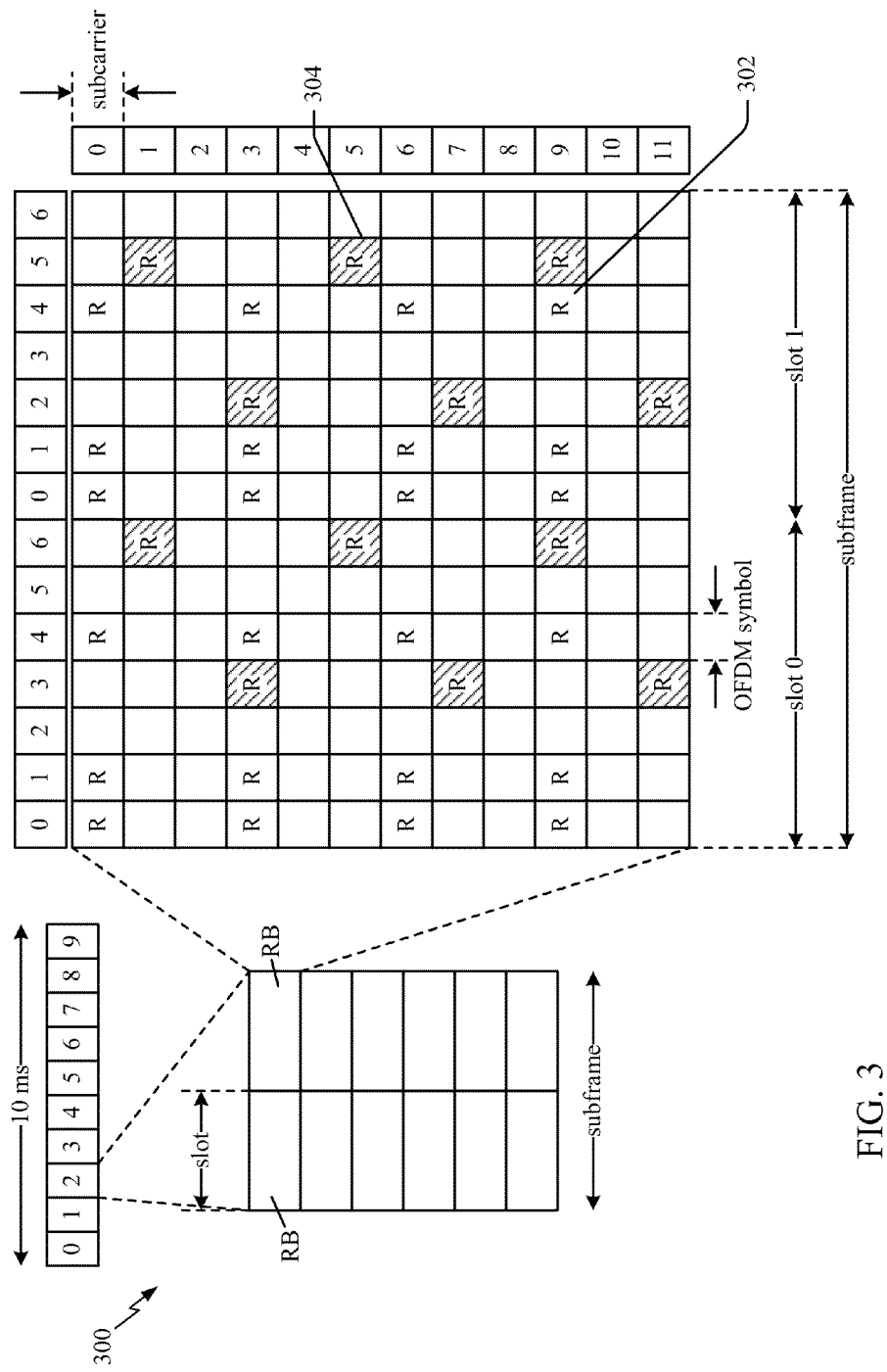
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
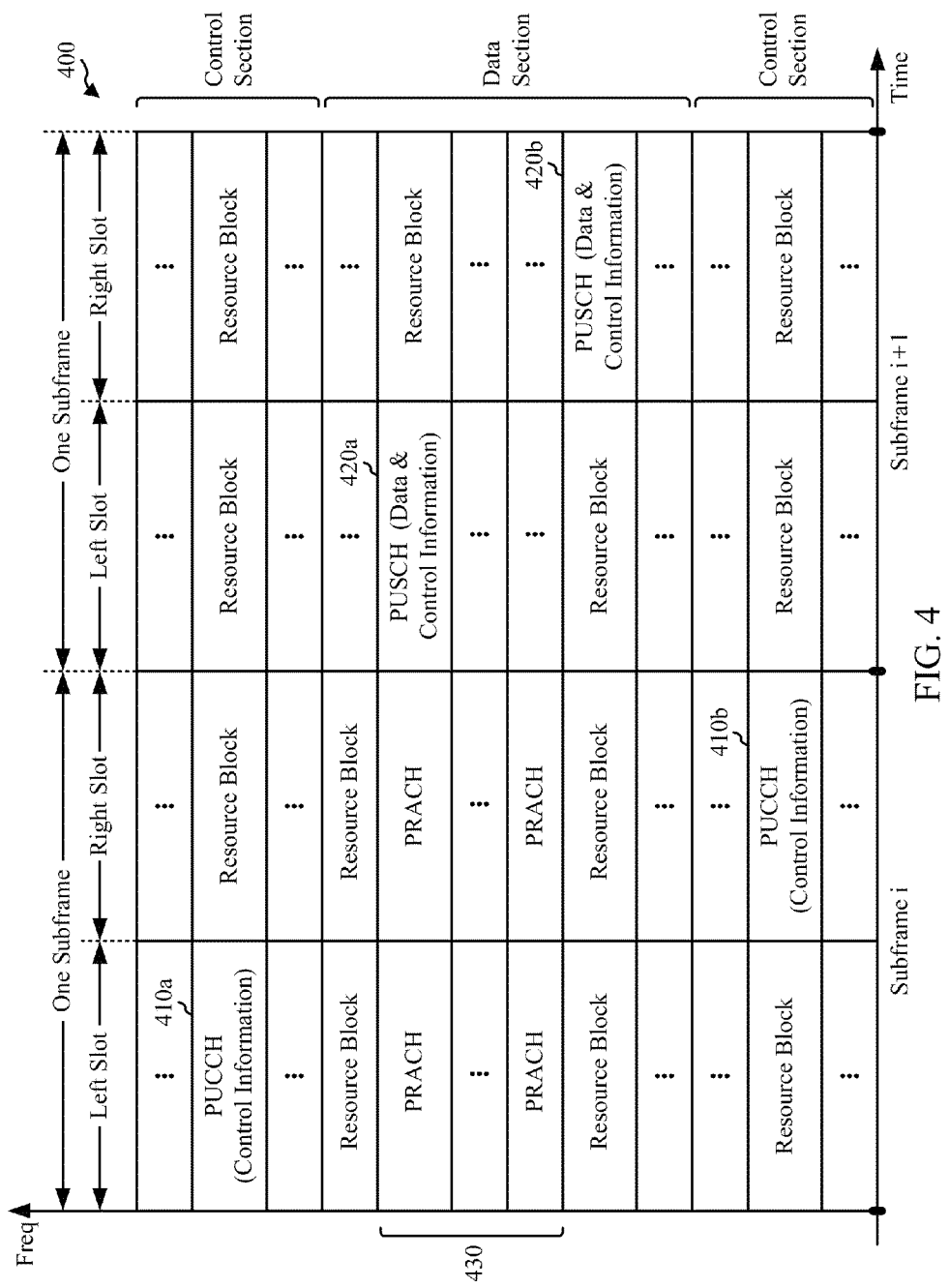
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
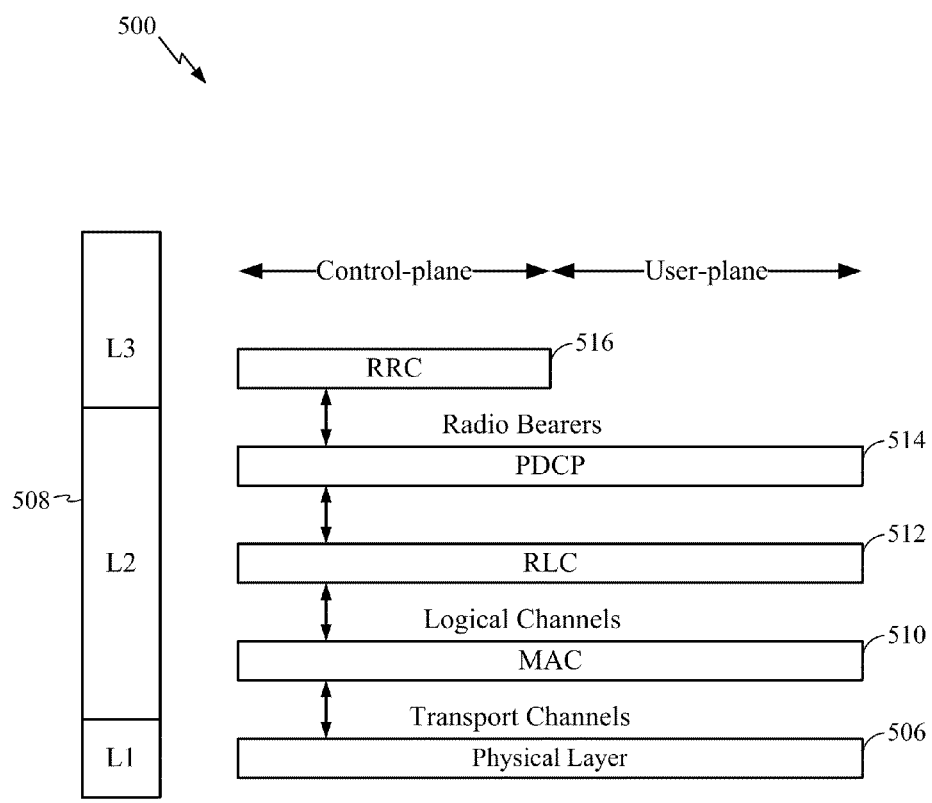
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
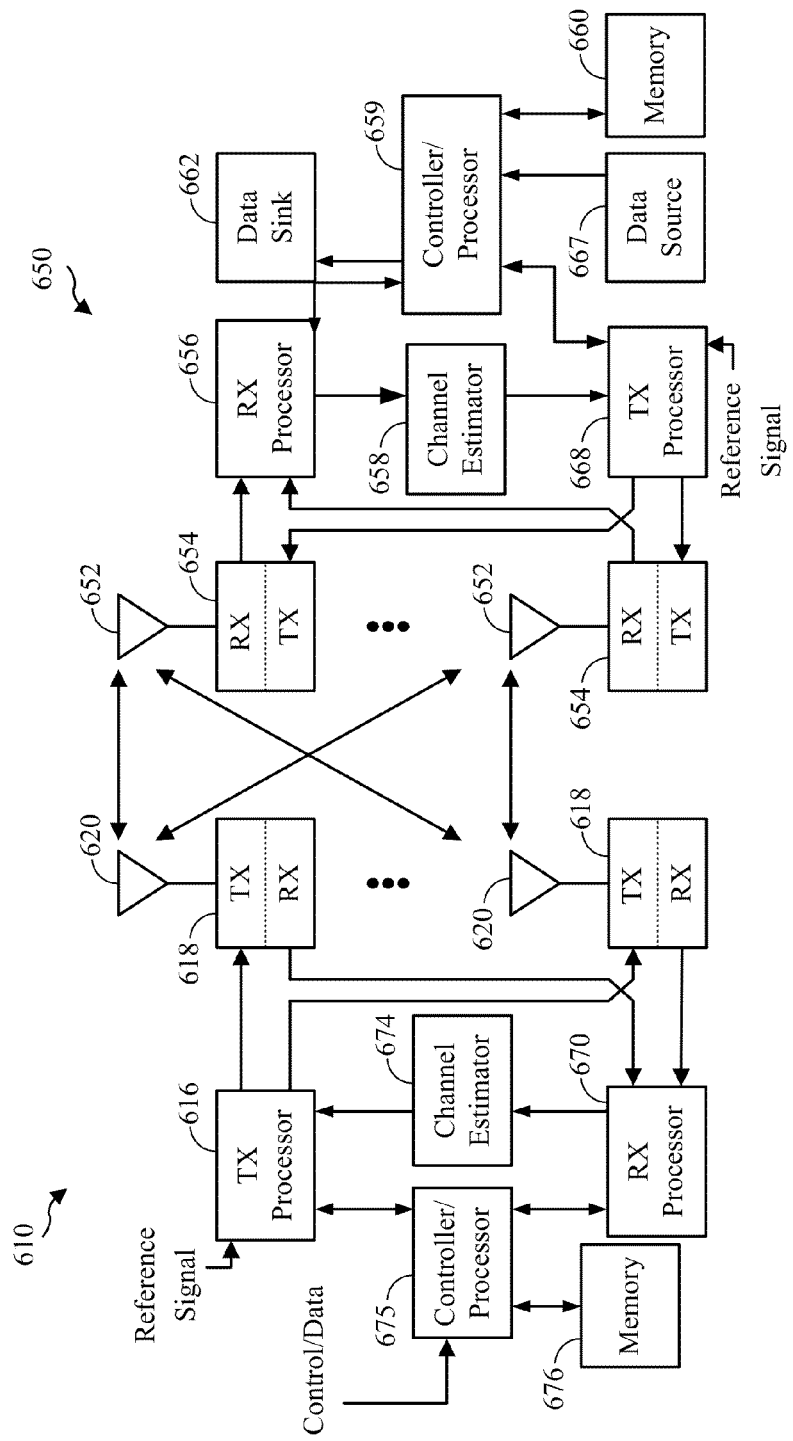
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Connected Mode Gap Measurement for LTE TDD

In a connected mode, a user equipment (UE) uses a six millisecond (ms) gap to measure a reference signal received power (RSRP) of an inter-frequency neighbor cell. The UE does not transmit any data during the gap and tunes onto a neighbor cell carrier frequency to measure the reference signal received power. The UE may measure one or more neighbor cells per gap. In some cases, the UE measures the reference signal received power and a reference signal received quality (RSRQ) for the identified inter-frequency neighbor cells. The measured reference signal received power may be used to determine whether the UE should request a handover to a neighbor cell that is stronger than the serving cell.

Considering a radio frequency (RF) tune away and tune back time, the sample capture duration for measuring the reference signal received power is approximately 5.083 ms (e.g., the sum of five subframes (SFs) and one OFDM symbol). In some configurations, six resource blocks (RB) may be used for the narrowband reference signal received power measurements. In the present disclosure, for example, the 5.083 ms measurement window may be referred to as a measurement window.

In an MBSFN (multimedia broadcast single frequency network or multimedia broadcast multicast service single frequency network), non-MBSFN subframes may be used to measure the reference signal received power because the UE may not be aware of the MBSFN configuration of a neighbor cell. The reference signal symbols (RSS) of each downlink subframe are used for measuring the reference signal received power. Specifically, four reference signal symbols of a downlink subframe may be used for measuring the reference signal received power. It should be noted that using the reference signal symbols to measure the reference signal received power refers to the destaggering of the reference signals to obtain a time-domain channel impulse response (CIR). More specifically, two consecutive reference signal symbols are destaggered, and two CIRs are combined to obtain a channel energy response (CER). The reference signal received power is obtained from the channel energy response. The use of the reference signal symbols to obtain the reference signal received power will be explained in more detail below.

In a LTE network, two consecutive reference signal symbols are specified with pilot tones in different locations. The location of the pilot tones of one reference signal symbol may be shifted by half of the tone spacing from that of a previous reference signal symbol. Destaggering refers to the combination of the two adjacent reference signal symbols in frequency domain to reduce the effective tone spacing. The reduced effective tone spacing may enable the system to accommodate a longer delay spread.

For time-division duplex (TDD), the non-MBSFN downlink subframes are subframe zero (SF0), subframe one (SF1), subframe five (SF5), and subframe six (SF6). Additionally, for frequency-division duplex (FDD), the non-MBSFN downlink subframes are SF0, subframe four (SF4), SF5, and subframe nine (SF9).

In a FDD system, each non-MBSFN subframe (SF0, SF4, SF5, and SF9) has four reference signal symbols (RSS0, RSS4, RSS7, and RSS11) that may be used for measuring the reference signal received power. Additionally, in a TDD system, SF0 and SF5 are considered normal downlink subframes with four reference signal symbols (RSS0, RSS4, RSS7, and RSS11) available for measuring the reference signal received power. Still, in a TDD system, SF1 and SF6 are special subframes.

The special subframes may have one to four reference signal symbols available for the reference signal received power measurement based on the special subframe configuration. If the UE is unaware of the special subframe configuration of a neighbor cell, the UE assumes a worst case configuration where only one reference signal symbol is available. That is, the worst case configuration refers to the configuration where the full downlink subframe of SF1 or SF6 is not guaranteed, and therefore, the UE assumes that only one of the four reference signal symbols is available. Thus, when the UE is unaware of the special subframe configuration of a neighbor cell, one reference signal symbol of each of the special subframes (SF1 and SF6) is used for measuring the reference signal received power.

Accordingly, in a TDD-MBSFN system, because only one reference signal symbol may be used for the special subframes (SF1 and SF6), the measurement of the reference signals specifies different patterns for combining the reference signal symbols based on an alignment of the non-MBSFN downlink subframes and the measurement window. In one aspect of the present disclosure, a generalized measurement strategy is described for combining reference signal symbols from different subframes based on a measurement window location with respect to the non-MBSFN downlink subframes.

In a conventional FDD system, the reference signal received power is measured by extracting twelve reference signal frequency tones for each transmit/receive pair. After extracting the twelve reference signal frequency tones, the first, second, third, and fourth reference signal symbols are destaggered to obtain two 32-tap time-domain channel impulse responses (CIRs). The two CIRs are combined to obtain a channel energy response (CER). The reference signal received power is estimated by identifying and accumulating energy taps from the CER. In one configuration, the largest estimated reference signal received power is selected from the received transmissions.

In some cases, the signal energy taps are identified by thresholding. The threshold is obtained by estimating noise power from the CER and multiplying the estimated noise power by a constant.

In one configuration, for a TDD-MBSFN system, the UE assumes a worst case configuration where all subframes (other than SF0, SF1, SF5, and SF6) are MBSFN subframes and only one reference signal symbol is available in the special subframes. In one configuration, the worst case configuration is when the neighbor cell has a UL_DL_cfg and SSF_cfg equal to zero. Thus, based on the assumption of the worst case configuration, reference signal symbols selected from the four reference signal symbols available from both SF0 and SF5 and one reference signal symbol available from both SF1 and SF6 are used to estimate reference signal received power measurement.

Figure 7:
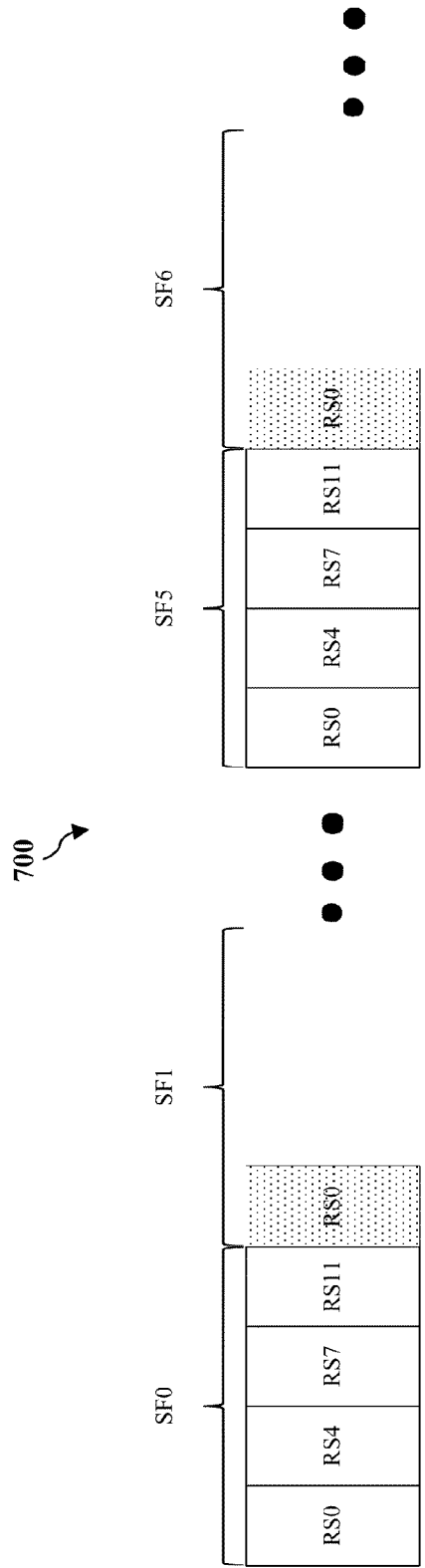
FIG. 7 is a diagram illustrating an example of downlink subframes according to an aspect of the present disclosure.

FIG. 7 is a diagram 700 that illustrates the reference signal symbols available for measuring the reference signal received power in a TDD-MBSFN system according to an aspect of the present disclosure. As illustrated in FIG. 7, four non-MBSFN downlink subframes (SF0, SF1, SF5, and SF6) of a neighbor cell are available for measuring the reference signal received power. Furthermore, as shown in FIG. 7, when the UE assumes the worst case configuration, four reference signal symbols (RSS0, RSS4, RSS7, and RSS11, respectively labeled as "RS0", "RS4", "RS7", and "RS11" in FIGS. 7-11B) from subframes zero and five (SF0 and SF5) are available for measuring the reference signal received power, and one reference signal symbol (RSS0, labeled as "RS0" in FIGS. 7-11B) from subframes one and six (SF1 and SF6) is available for measuring the reference signal received power. As previously discussed, for example, four reference signal symbols within the measurement window are used for measuring the reference signal received power.

Figure 8:
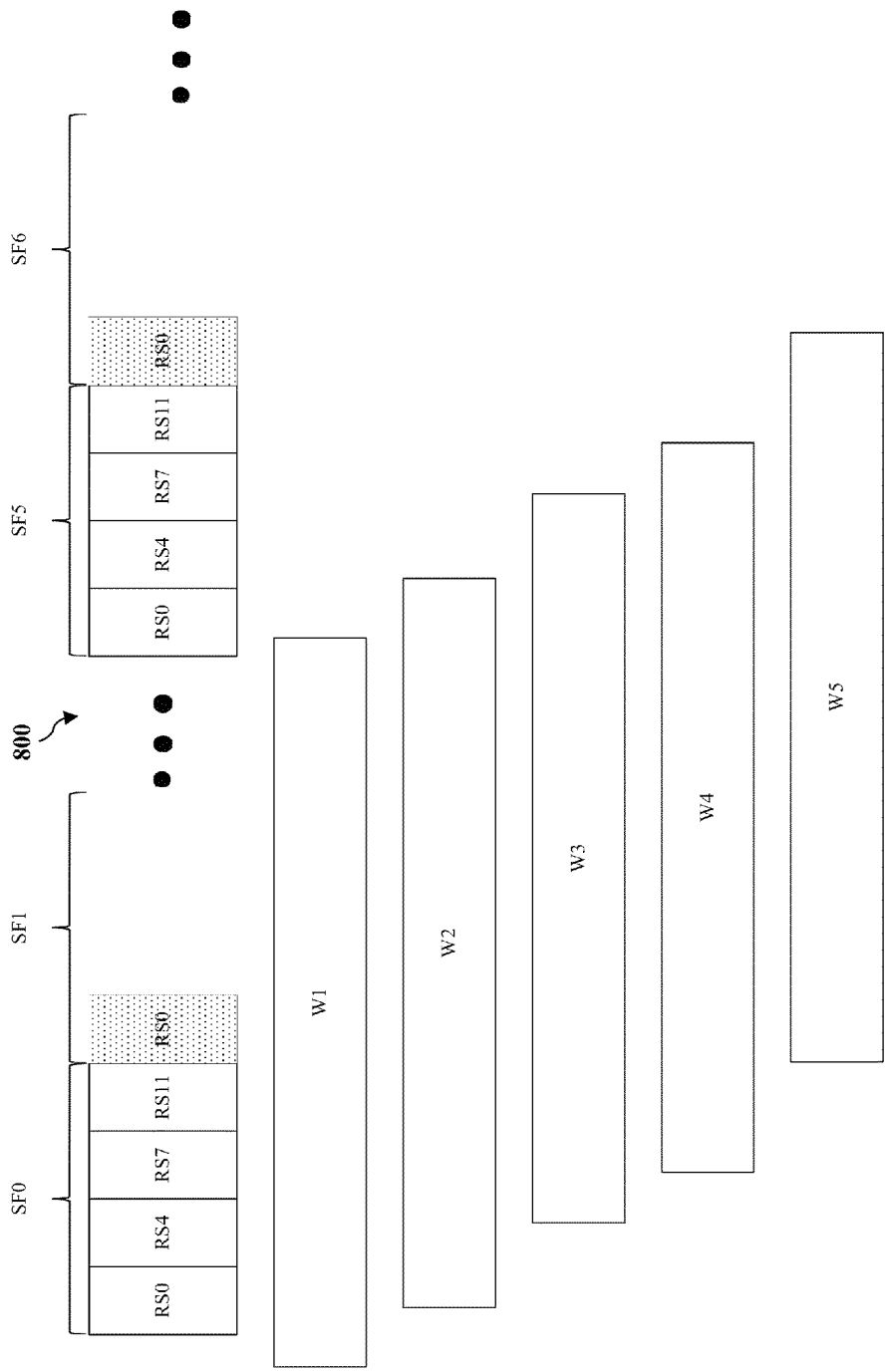
FIG. 8 is a diagram illustrating a timing offset between downlink subframes and a measurement window according to an aspect of the present disclosure.

In one configuration, based on the location of the measurement window with respect to the timing of the neighbor cell, five distinct patterns for reference signal received power measurement are specified in a TDD-MBSFN system. FIG. 8 illustrates an example of the five patterns for measuring the reference signal received power in a TDD-MBSFN system. As illustrated in FIG. 8, the measurement windows (W1-W5) may have different alignments with respect to the non-MBSFN downlink subframes of the neighbor cell based on the neighbor cell timing. That is, the neighbor cell timing and measurement window timing are arbitrary and may not be aligned. Therefore, the measurement window that is opened by the UE may have a different alignment with the non-MBSFN downlink subframes based on the neighbor cell timing. Accordingly, the five different measurement window locations (W1-W5) illustrate examples of the relative timing difference between the measurement window and the non-MBSFN downlink subframes of the neighbor cell.

FIG. 8 is a diagram 800 illustrating a timing offset between downlink subframes and a measurement window according to an aspect of the present disclosure. As shown in FIG. 8, in one case, the first measurement window (W1) may open prior to the first non-MBSFN downlink subframe (SF0). Therefore, for the first measurement window, RSS0, RSS4, RSS7, and RSS11 from SF0, and RSS0 from SF1 may be available for measuring the reference signal received power. In another case, the second measurement window (W2) may be opened during the time period of RSS0 of SF0. Thus, for the second measurement window, RSS4, RSS7, and RSS11 from SF0, RSS0 from SF1, and RSS0 from SF5 may be used for measuring the reference signal received power. In yet another case, the third measurement window may be opened during the time period of RSS4 of SF0. Therefore, for the third measurement window (W3), RSS7 and RSS11 from SF0, RSS0 from SF1, and RSS0 and RSS4 from SF5 may be used for measuring the reference signal received power.

In still yet another case, the fourth measurement window (W4) may be opened during the time period of RSS7 of SF0. Accordingly, for the fourth measurement window (W4), RSS11 from SF0, RSS0 from SF1, and RSS0, RSS4, and RSS7 from SF5 may be used for measuring the reference signal received power. In another case, the fifth measurement window (W5) may be opened during the time during the time period of RSS11 of SF0. Thus, for the fifth measurement window, RSS0 from SF1, and RSS0, RSS4, RSS7, and RSS 11 from SF5 may be used for measuring the reference signal received power.

According to an aspect of the present disclosure, based on the location of the measurement window relative to the non-MBSFN subframes of the neighboring cells, different reference signal combinations are used for measuring the reference signal received power. In one configuration, for the first measurement window, the four reference signal symbols within SF0 may be used for measuring the reference signal received power. Additionally, for the fifth measurement window, the four reference signal symbols within SF5 may be used for measuring the reference signal received power. In this configuration, two of the reference signal symbols from the same subframe (SF0 or SF5) are included in a first reference signal symbol pair. Furthermore, a second reference signal symbol pair includes the other two reference signal symbols from the subframe used for the first reference signal symbol pair.

In this configuration, the first and second reference signal symbol pairs are each destaggered to obtain the two CIRs. When the Doppler rate is above a threshold (e.g., high), the two CIRs are noncoherently combined. Alternatively, when the Doppler rate is below a threshold, the CIRs are coherently combined. A channel energy response (CER) is obtained from the combined CIR (coherently or noncoherently). Noise thresholding may be performed to identify signal energy taps. The signal energy taps are accumulated to obtain reference signal received power. In this configuration, the reference signal received power may be measured in a manner similar to the reference signal received power measurement for a FDD system.

Figure 9:
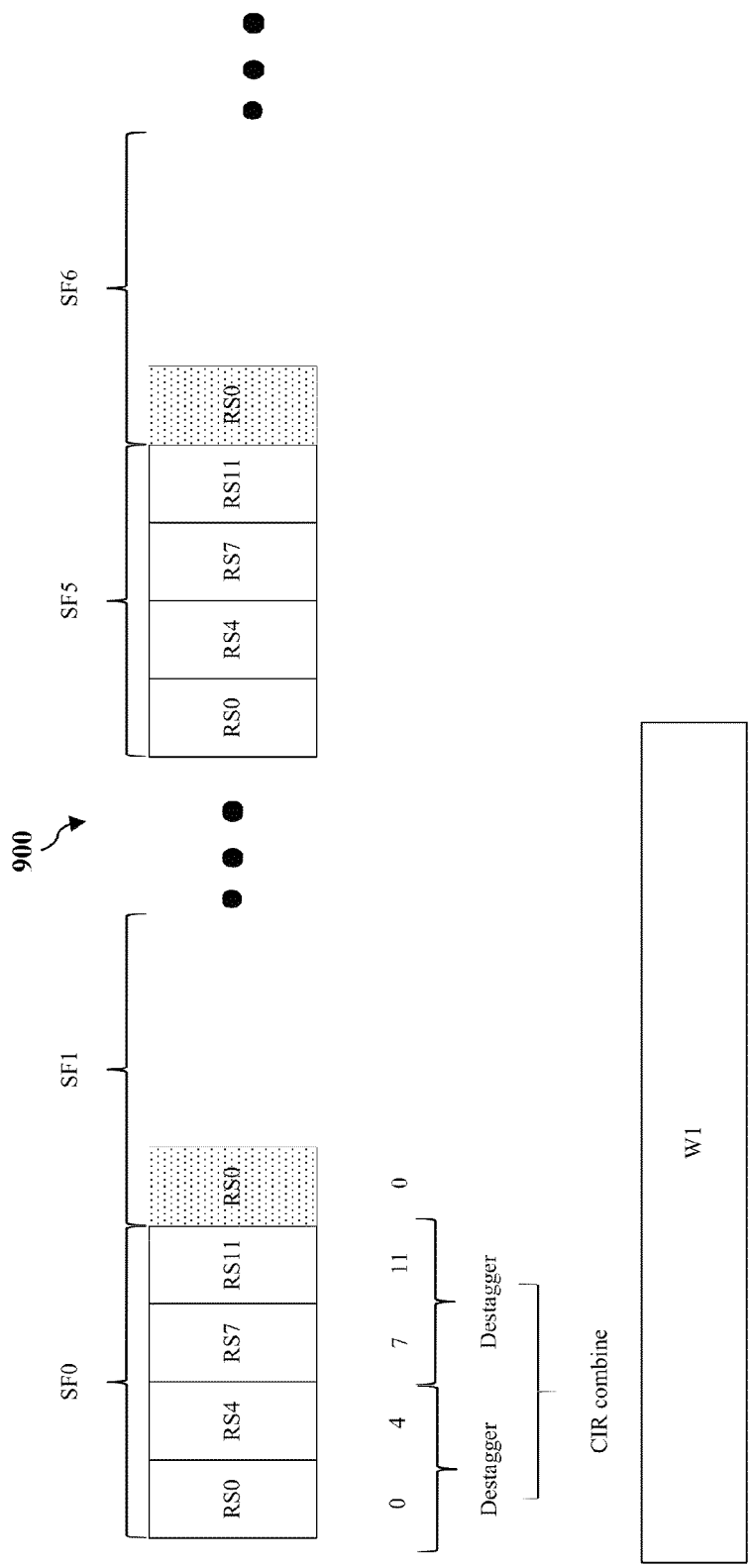
FIGS. 9, 10, 11A, and 11B are diagrams illustrating examples for combining reference signal symbols according to aspects of the present disclosure.

FIG. 9 is a diagram 900 that illustrates an example of measuring the reference signal received power for the first measurement window according to an aspect of the present disclosure. As shown in FIG. 9, a first reference signal symbol pair includes RSS0 and RSS4, and a second reference signal symbol pair includes RSS7 and RSS11. The first and second reference signal symbol pairs are destaggered to obtain two CIRs. The two CIRs are then combined to obtain the CER. As discussed above, when the Doppler rate is above a threshold, two CIRs are noncoherently combined. Alternatively, when the Doppler rate is below a threshold, the CIRs are coherently combined.

Figure 10:
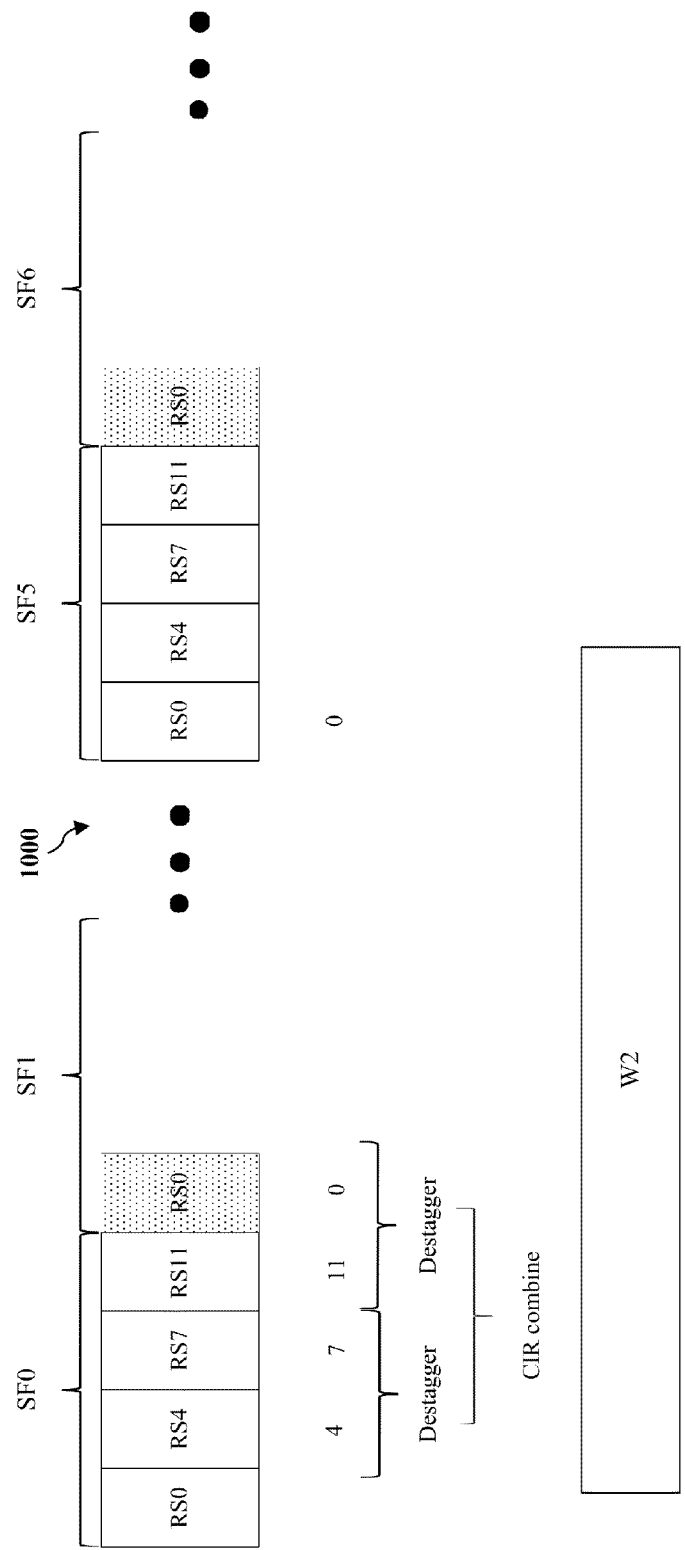

In another configuration, for the second measurement window, RSS4, RSS7, and RSS11 of SF0 and RSS0 of SF1 may be used for measuring the reference signal received power. FIG. 10 is a diagram 1000 that illustrates an example of measuring the reference signal received power for the second measurement window according to an aspect of the present disclosure. As shown in FIG. 10, a first reference signal symbol pair includes RSS4 and RSS7 from SF0, and a second reference signal symbol pair includes RSS11 from SF0 and RSS0 from SF1. The first and second reference signal symbol pairs may be destaggered to obtain two CIRs, and the CIRs may be combined to obtain the CER. Noise thresholding may be performed to identify signal energy taps. The signal energy taps are accumulated to obtain reference signal received power.

In yet another configuration, for the third and fourth measurement windows, the reference signal symbols of multiple subframes may be used for measuring the reference signal received power. That is, for the third measurement window, RSS7 and RSS11 from SF0, RSS0 from SF1, and RSS0 and RSS4 from SF5 may be used for measuring the reference signal received power. Furthermore, for the fourth measurement window, RSS11 from SF0, RSS0 from SF1, and RSS0, RSS4, and RSS7 from SF5 may be used for measuring the reference signal received power.

In this configuration, the reference signal symbol combining may be performed based on four reference signal symbols selected across multiple subframes or three reference signal symbols selected across multiple subframes. In the case of four reference signal symbols selected across multiple subframes, a first reference signal symbol pair is selected from the four reference signal symbols, and a second reference signal symbol pair is selected from the remaining reference signal symbols not selected for the first reference signal symbol pair. The first and second reference signal symbols pair are destaggered and noncoherently combined to obtain the CER. The reference signal received power is measured similar to the previous configurations. In the present configuration, the CIRs are noncoherently combined because the reference signal symbols are selected from nonadjacent subframes. As described herein, coherent combining may refer to the phase of two quantities being unchanged before addition. Noncoherent combining may refer to removing the phase by squaring prior to addition.

Figure 11A:
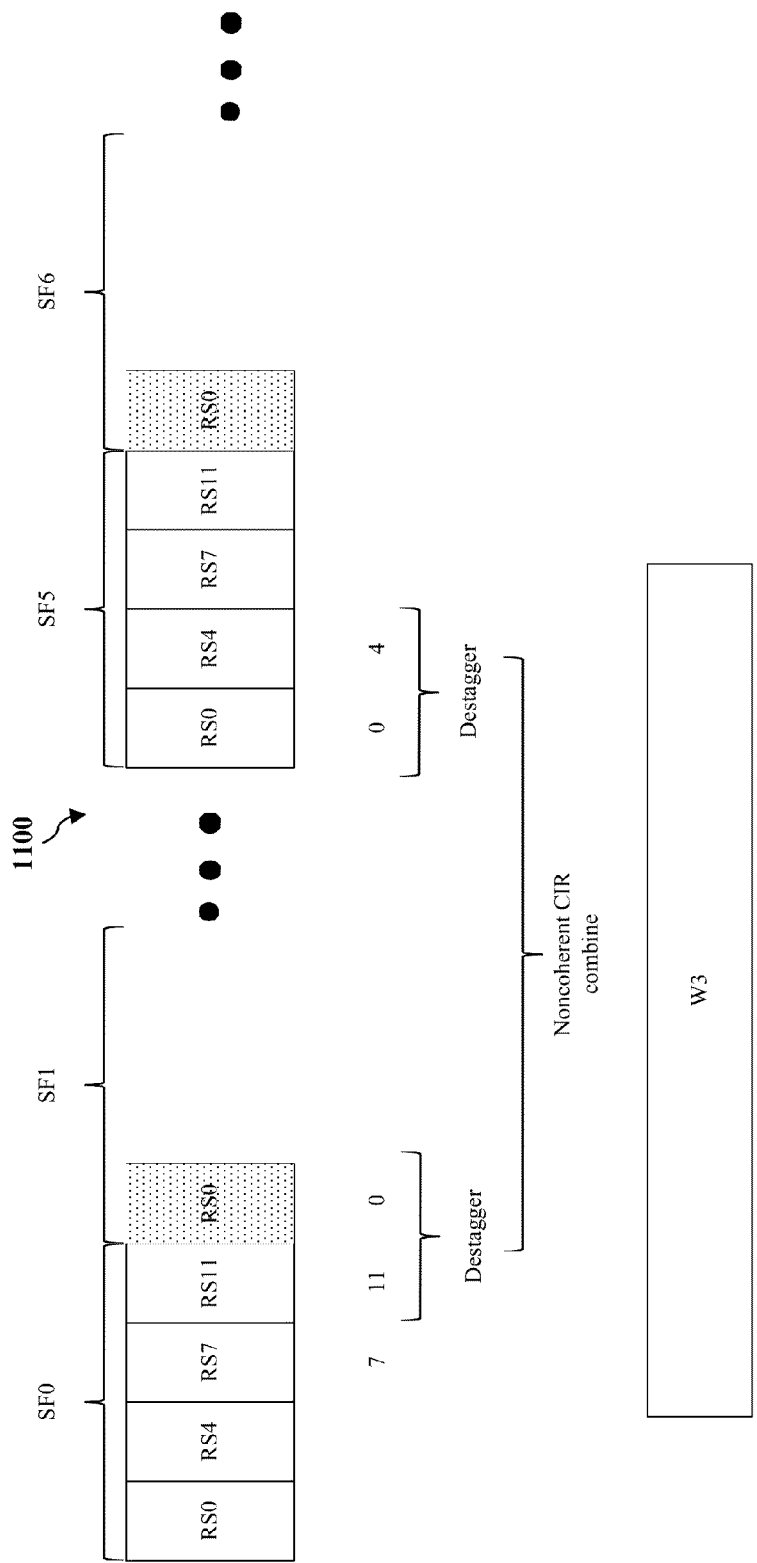

FIG. 11A is a diagram 1100 that illustrates an example of measuring the reference signal received power when the neighbor cell timing falls within the third measurement window and four reference signal symbols are selected across multiple subframes to measure the reference signal received power. As illustrated in FIG. 11A, RSS11 of SF0 and RSS0 of SF1 may be selected for a first reference signal symbol pair, and RSS0 and RSS4 of SF5 may be selected as a second reference signal symbol pair. Because the selected pairs are from nonadjacent subframes, the selected pairs are destaggered to obtain two CIRs, which are noncoherently combined to obtain the CER. The reference signal received power is measured in a manner similar to the previous configurations.

In the present configuration, in the case of three reference signal symbols selected across multiple subframes, a first reference signal symbol pair includes a first selected reference signal symbol and a second selected reference signal symbol. Furthermore, a second reference signal symbol pair includes, for example, the second selected reference signal symbol and a third selected reference signal symbol. The pairs are destaggered and the CIRs are combined to obtain the CER. The reference signal received power is then measured in a manner similar to the previous configurations.

Figure 11B:
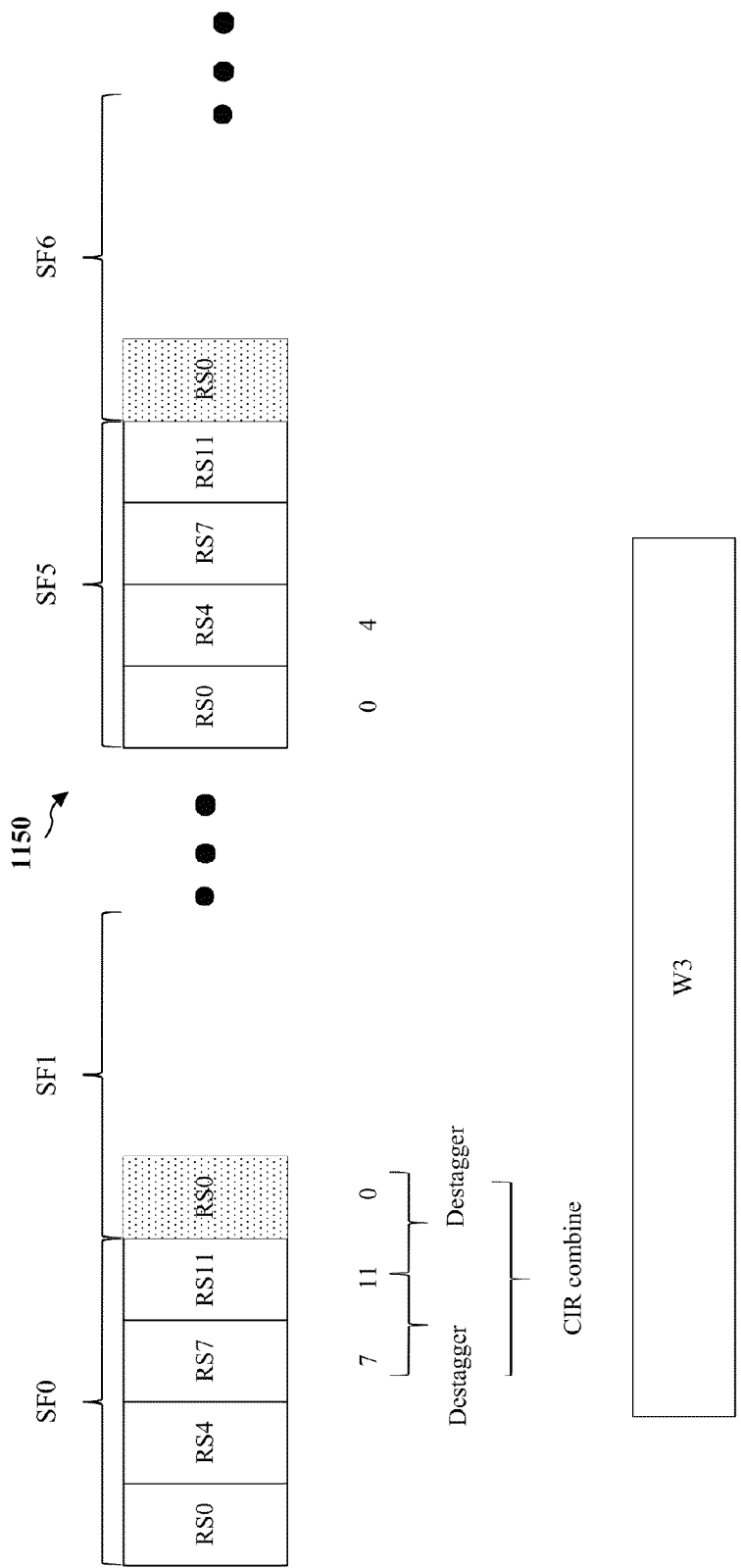

FIG. 11B is a diagram 1150 that illustrates an example for measuring the reference signal received power when the neighbor cell timing falls within the third measurement window and three reference signal symbols are selected across multiple subframes to measure the reference signal received power. As illustrated in FIG. 11B, RSS7 and RSS11 of SF0 may be selected for a first reference signal symbol pair, and RSS11 of SF0 and RSS0 of SF1 may be selected as a second reference signal symbol pair. The selected pairs are destaggered to obtain two CIRs, which are combined to obtain the CER. The reference signal received power is then measured similar to the previous configurations.

Figure 12:
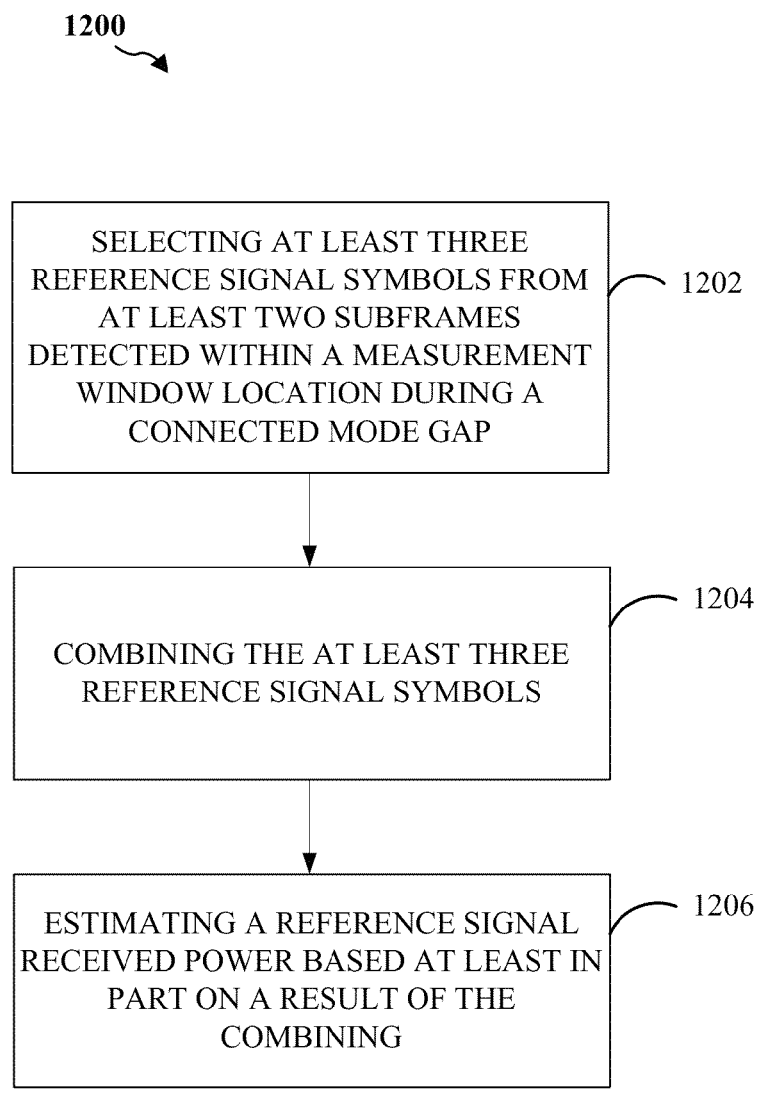
FIG. 12 is a block diagram illustrating a method for combining reference signal symbols for gap measurements according to an aspect of the present disclosure.

FIG. 12 illustrates a method 1200 for wireless communication. In block 1202, a UE selects at least three reference signal symbols from at least two subframes detected within a measurement window location during a connected mode gap. The UE combines the selected reference signal symbols in block 1204. Furthermore, in block 1206, the UE estimates a reference signal received power based at least in part on a result of the combining.

In one configuration, UE 650 is configured for wireless communication including means for selecting, means for combining, and means for estimating. In one configuration, the means for selecting may include receive processor 656, transmitter(s)/receiver(s) 654, controller/processor 659, memory 660, channel estimator 658, and/or antenna 652 configured to perform the functions recited by the means for selecting. The combining means and the estimating means may include controller/processor 659 and/or memory 660. In another configuration, the aforementioned means may be any module or any apparatus configured to perform the functions recited by the aforementioned means.

Figure 13:
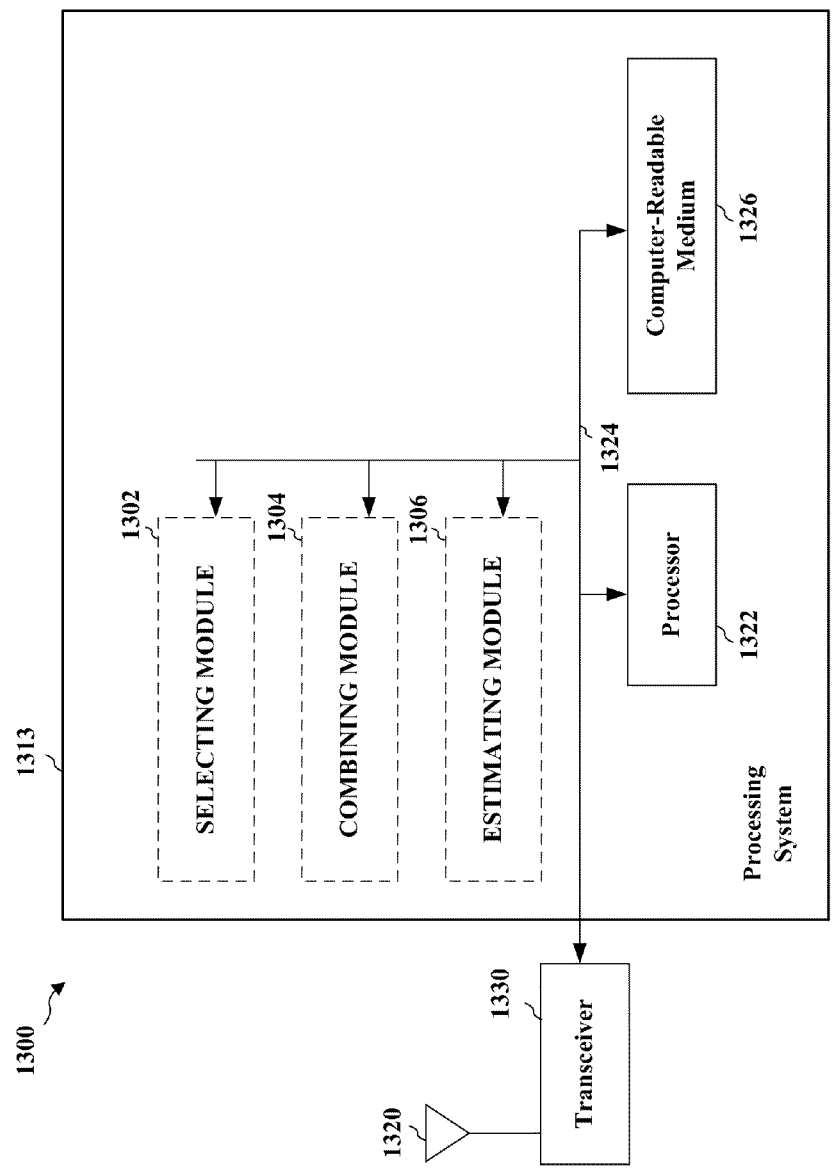
FIG. 13 is a block diagram illustrating different modules/means/components in an exemplary apparatus.

FIG. 13 is a diagram illustrating an example of an implementation for an apparatus 1300 employing a processing system 1313. The processing system 1313 may be implemented with an interconnect architecture that couples the various elements, represented generally by bus 1324. Bus 1324 may include any number of interconnecting buses and bridges depending on the specific application of the processing system 1313 and the overall design constraints. The bus 1324 links together various circuits and/or elements including one or more processors and/or modules, represented by processor 1322, modules 1302, 1304, 1306, and computer-readable medium 1326. Bus 1324 may also link various other circuits and/or elements such as timing sources, peripherals, voltage regulators, and power management modules, which are well known in the art, and therefore, will not be described any further.

The apparatus includes a processing system 1313 coupled to a transceiver 1330. The transceiver 1330 is coupled to one or more antennas 1320. The transceiver 1330 enables communicating with various other apparatuses over a transmission medium. The processing system 1313 includes a processor 1322 coupled to a computer-readable medium 1326. The processor 1322 is responsible for general processing, including the execution of software stored on the computer-readable medium 1326. The software, when executed by the processor 1322, causes the processing system 1313 to perform, for example, various functions described for any particular apparatus. The computer-readable medium 1326 may also be used for storing data that is manipulated by the processor 1322 when executing software.

The processing system 1313 includes a selecting module 1302 for selecting at least three reference signal symbols from at least two subframes detected within a measurement window location during a connected mode gap. The processing system 1313 also includes a combining module 1304 for combining the selected reference signal symbols. The processing system 1313 may further include an estimating module 1306 for estimating a RSRP based at least in part on a result of the combining. The modules may be software modules running in the processor 1322, resident/stored in the computer-readable medium 1326, one or more hardware modules coupled to the processor 1322, or combinations thereof. The processing system 1313 may be a component of the UE 650 and may include memory 660, and/or controller/processor 659.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, elements, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, elements, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, PCM (phase change memory), ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, flash memory, PCM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    tuning to a multimedia broadcast single frequency network (MBSFN) neighbor cell, while connected to a serving cell, during a connected mode gap, to measure at least reference signals of the MBSFN neighbor cell, a measurement window of the connected mode gap being arbitrary to a timing of downlink subframes of the MBSFN neighbor cell;
    selecting at least three reference signal symbols, for measuring the reference signals, from at least one non-MBSFN subframe of the MBSFN neighbor cell detected within the measurement window of the connected mode gap and a special subframe of the MBSFN neighbor cell detected within a measurement window location regardless of an alignment of the measurement window with the downlink subframes, the at least three reference signal symbols being selected from at least two reference signal symbols of the at least one non-MBSFN subframe and one reference signal symbol of the special subframe;
    combining the at least three reference signal symbols; and
    estimating a reference signal received power (RSRP) based at least in part on a result of the combining.

2. The method of claim 1, in which the at least three reference signal symbols are from a plurality of separate non-MBSFN subframes.

3. The method of claim 1, further comprising destaggering the at least three reference signal symbols, in which the combining comprises combining channel impulse responses (CIRs) obtained from the destaggered at least three reference signal symbols.

4. The method of claim 3, in which the combining comprises non-coherent combining when different subframes are not adjacent to each other.

5. The method of claim 1, in which the selecting comprises selecting four reference signal symbols from one non-MBSFN subframe detected within the measurement window location.

6. The method of claim 1, in which the selecting comprises selecting the at least two reference signal symbols from one non-MBSFN subframe.

7. The method of claim 1, in which the at least three reference signal symbols are selected when a special subframe configuration of a neighbor cell is unknown.

8. An apparatus for wireless communications, comprising:
    means for tuning to a multimedia broadcast single frequency network (MBSFN) neighbor cell, while connected to a serving cell, during a connected mode gap, to measure at least reference signals of the MBSFN neighbor cell, a measurement window of the connected mode gap being arbitrary to a timing of downlink subframes of the MBSFN neighbor cell;

means for selecting at least three reference signal symbols, for measuring the reference signals, from at least one non-MBSFN subframe of the MBSFN neighbor cell detected within the measurement window of the connected mode gap and a special subframe of the MBSFN neighbor cell detected within a measurement window location regardless of an alignment of the measurement window with the downlink subframes, the at least three reference signal symbols being selected from at least two reference signal symbols of the at least one non-MBSFN subframe and one reference signal symbol of the special subframe;

means for combining the at least three reference signal symbols; and means for estimating a reference signal received power (RSRP) based at least in part on a result of the combining.

9. The apparatus of claim 8, in which the means for selecting comprises means for selecting four reference signal symbols from one non-MBSFN subframe detected within the measurement window location.

10. The apparatus of claim 8, in which the means for selecting comprises means for selecting the at least two reference signal symbols from one non-MBSFN subframe.

11. A computer program product, executable by a processor, for wireless communications, the computer program product comprising:

a non-transitory computer-readable medium having program code recorded thereon, the program code comprising:

program code to tune to a multimedia broadcast single frequency network (MBSFN) neighbor cell, while connected to a serving cell, during a connected mode gap, to measure at least reference signals of the MBSFN neighbor cell, a measurement window of the connected mode gap being arbitrary to a timing of downlink subframes of the MBSFN neighbor cell;

program code to select at least three reference signal symbols, for measuring the reference signals, from at least one non-MBSFN subframe of the MBSFN neighbor cell detected within the measurement window of the connected mode gap and a special subframe of the MBSFN neighbor cell detected within a measurement window location regardless of an alignment of the measurement window with the downlink subframes, the at least three reference signal symbols being selected from at least two reference signal symbols of the at least one non-MBSFN subframe and one reference signal symbol of the special subframe;

program code to combine the at least three reference signal symbols; and program code to estimate a RSRP based at least in part on a result of the combining.

12. The computer program product of claim 11, in which the program code to select comprises program code to select four reference signal symbols from one non-MBSFN subframe detected within the measurement window location.

13. The computer program product of claim 11, in which the program code to select comprises program code to select the at least two reference signal symbols from one non-MBSFN subframe.

14. An apparatus for wireless communications, comprising:

a memory; and at least one processor coupled to the memory, the at least one processor being configured:

to tune to a multimedia broadcast single frequency network (MBSFN) neighbor cell, while connected to a serving cell, during a connected mode gap, to measure at least reference signals of the MBSFN neighbor cell, a measurement window of the connected mode gap being arbitrary to a timing of downlink subframes of the MBSFN neighbor cell;

to select at least three reference signal symbols, for measuring the reference signals, from at least one non-MBSFN subframe of the MBSFN neighbor cell detected within the measurement window of the connected mode gap and a special subframe of the MBSFN neighbor cell detected within a measurement window location regardless of an alignment of the measurement window with the downlink subframes, the at least three reference signal symbols being selected from at least two reference signal symbols of the at least one non-MBSFN subframe and one reference signal symbol of the special subframe;

to combine the at least three reference signal symbols; and to estimate a reference signal received power (RSRP) based at least in part on a result of the combining.

15. The apparatus of claim 14, in which the at least one processor is further configured to select the at least three reference signal symbols from a plurality of separate non-MBSFN subframes.

16. The apparatus of claim 14, in which the at least one processor is further configured:

to destagger the at least three reference signal symbols; and to combine channel impulse responses (CIRs) obtained from the destaggered at least three reference signal symbols.

17. The apparatus of claim 16, in which the at least one processor is further configured to non-coherently combine the at least three reference signal symbols when different subframes are not adjacent to each other.

18. The apparatus of claim 14, in which the at least one processor is further configured to select four reference signal symbols from one non-MBSFN subframe detected within the measurement window location.

19. The apparatus of claim 14, in which the at least one processor is further configured to select the at least two reference signal symbols from one non-MBSFN subframe.

20. The apparatus of claim 14, in which the at least one processor is further configured to select the at least three reference signal symbols when a special subframe configuration of a neighbor cell is unknown.

* * * * *